US011085664B2

(12) United States Patent
    Elwell

(10) Patent No.: US 11,085,664 B2
(45) Date of Patent: Aug. 10, 2021

(54) LIGHT FIXTURE SENSORS FOR EXTERNAL USE

(71) Applicant: SIGNIFY HOLDING B.V., Eindhoven (NL)

(72) Inventor: Brian Eugene Elwell, Tyrone, GA (US)

(73) Assignee: SIGNIFY HOLDING B.V., Eindhoven (NL)

(*) Notice: Subject to any disclaimer, the term of this patent is extended or adjusted under 35 U.S.C. 154(b) by 303 days.

(21) Appl. No.: 16/006,466

(22) Filed: Jun. 12, 2018

(65) Prior Publication Data
US 2018/0372364 A1    Dec. 27, 2018

Related U.S. Application Data

(60) Provisional application No. 62/522,861, filed on Jun. 21, 2017.

(51) Int. Cl.
    F24F 11/89      (2018.01)
    F21V 33/00      (2006.01)
    F24F 7/08       (2006.01)
    F24F 110/70     (2018.01)
    F24F 110/20     (2018.01)
    F24F 110/40     (2018.01)
    F24F 110/10     (2018.01)

(52) U.S. Cl.
    CPC .......... F24F 11/89 (2018.01); F21V 33/0076 (2013.01); F21V 33/0092 (2013.01); F24F 7/08 (2013.01); F24F 2110/10 (2018.01); F24F 2110/20 (2018.01); F24F 2110/40 (2018.01); F24F 2110/70 (2018.01); F24F 2221/02 (2013.01)

(58) Field of Classification Search
    None
    See application file for complete search history.

(56) References Cited

U.S. PATENT DOCUMENTS 10,585,004 B1 *  3/2020  Joseph ............... G01J 5/025
10,619,873 B2 *  4/2020  Monkkonen ......... F24F 11/0001

* cited by examiner

Primary Examiner — Sean Shechtman

(57) ABSTRACT

A light fixture can include a housing and a sensor coupled to the housing. The sensor of the light fixture can include a first port disposed in the occupiable volume of space, where the first port is configured to measure a first parameter in the occupiable volume of space. The sensor of the light fixture can also include a second port disposed in a plenum volume of space, where the second port is configured to measure the first parameter in the plenum volume of space. The sensor of the light fixture can further include a first transducer coupled to the first port and the second port, where the first transducer is configured to determine a first parameter differential between the first parameter measured by the first port and the first parameter measured by the second port.

16 Claims, 5 Drawing Sheets

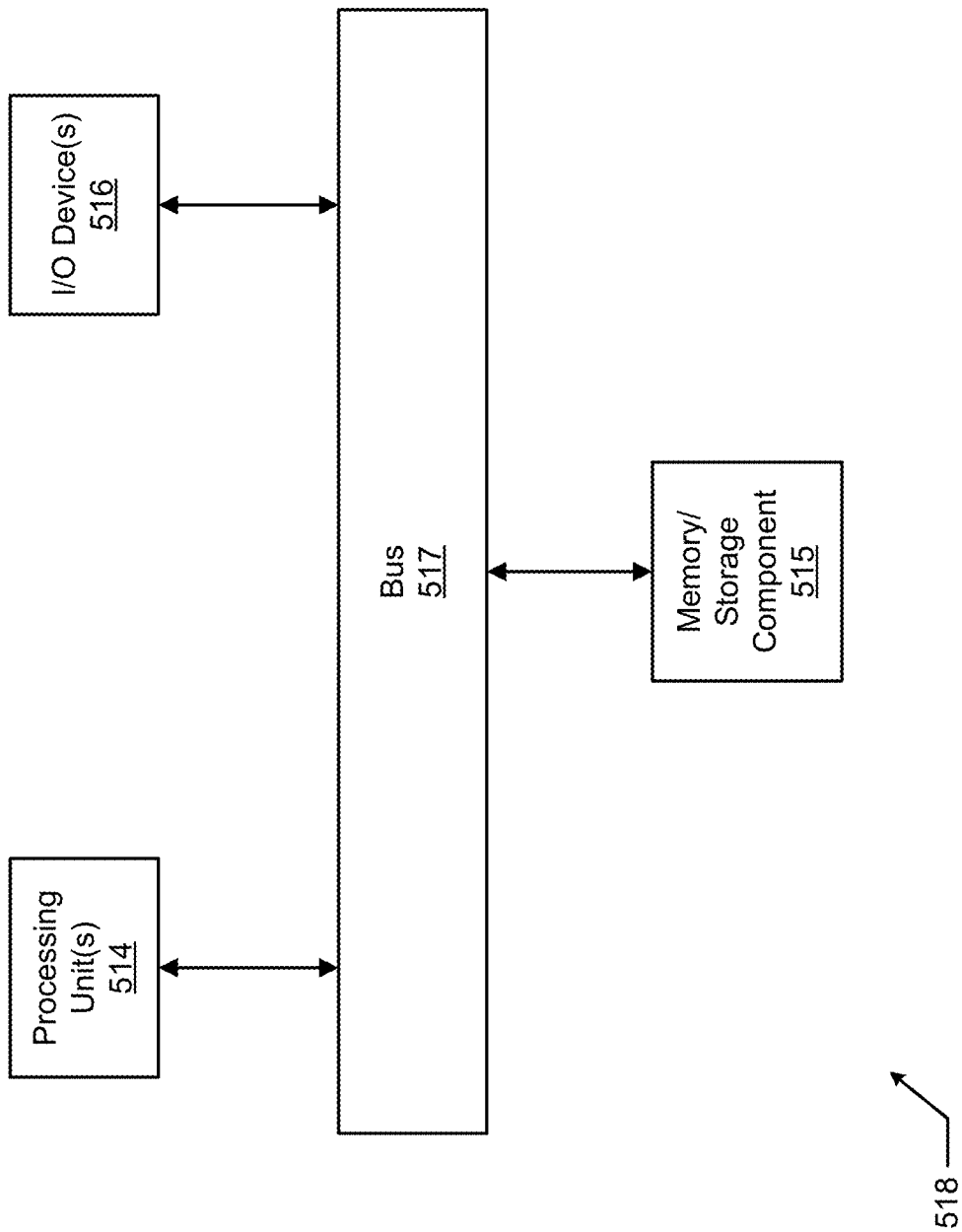

LIGHT FIXTURE SENSORS FOR EXTERNAL USE

CROSS-REFERENCE TO RELATED APPLICATIONS

This application claims priority under 35 U.S.C. § 119 to U.S. Provisional Patent Application Ser. No. 62/522,861, titled "Light Fixture Sensors For External Use" and filed on Jun. 21, 2017, the entire contents of which are hereby incorporated herein by reference.

TECHNICAL FIELD

The present disclosure relates generally to light fixtures, and more particularly to systems, methods, and devices for light fixture sensors that are used for systems external from a lighting system.

BACKGROUND

Volumes of space (e.g., rooms) often have multiple systems located in or proximate to the volume of space. For example, a volume of space can have a lighting system, a HVAC system, a security system, a fire protection system, a networking system, and a media system. In some cases, a volume of space has a plenum space in which equipment (e.g., electrical conductors, ductwork, motors, speakers, switches) from one or more of these systems resides but is out of view of occupants of the volume of space.

SUMMARY

In general, in one aspect, the disclosure relates to a light fixture that includes a housing and a first sensor device coupled to the housing. The first sensor device can include a first port disposed in an occupiable volume of space, where the first port is configured to measure a first parameter in the occupiable volume of space. The first sensor device can also include a second port disposed in a plenum volume of space, where the second port is configured to measure the first parameter in the plenum volume of space. The first sensor device can further include a first transducer coupled to the first port and the second port, where the first transducer is configured to determine a first parameter differential between the first parameter measured by the first port and the first parameter measured by the second port.

In another aspect, the disclosure can generally relate to a lighting system that includes a first light fixture. The first light fixture can include a first housing disposed on a medium that separates an occupiable volume of space from a plenum volume of space. The first light fixture can include a first pressure sensor. The first pressure sensor of the first housing can include a first port disposed in the occupiable volume of space, where the first port measures a first pressure in the occupiable volume of space. The first pressure sensor of the first housing can include a second port disposed in the plenum volume of space, where the second port measures a second pressure in the plenum volume of space. The first pressure sensor of the first housing can include a first transducer coupled to the first port and the second port, where the first transducer determines a first pressure differential between the first pressure measured by the first port and the second pressure measured by the second port. The lighting system can also include an external system communicably coupled to the first pressure sensor, where the external system is unrelated to the first light fixture, where the external system includes a controller that receives a first signal that includes the first pressure differential, where the first pressure differential is used to control operation of the external system. The external system can identify a first location of the first light fixture in the plenum volume of space and the occupiable volume of space using the first signal, where the operation of the external system is controlled by the external system based on the first location.

In yet another aspect, the disclosure can generally relate to a system. The system can include a light fixture and an external system that is unrelated to the direct operation of the light fixture. The light fixture can include a housing disposed proximate to a medium that separates an occupiable volume of space from a plenum volume of space. The light fixture can also include a sensor device coupled to the housing that measures a parameter that is unrelated to direct operation of the light fixture. The sensor device of the light fixture can include a first port disposed in an occupiable volume of space, where the first port measures the parameter in the occupiable volume of space. The sensor device of the light fixture can also include a second port disposed in a plenum volume of space, where the second port measures the parameter in the plenum volume of space. The sensor device of the light fixture can further include a transducer coupled to the first port and the second port, where the transducer determines a parameter differential between the parameter measured by the first port and the parameter measured by the second port. The external system can include a controller that receives the parameter differential from the sensor device, where the parameter affects operations of the external system.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 5 shows a computing device in accordance with certain example embodiments.

DETAILED DESCRIPTION

Figure 1A:
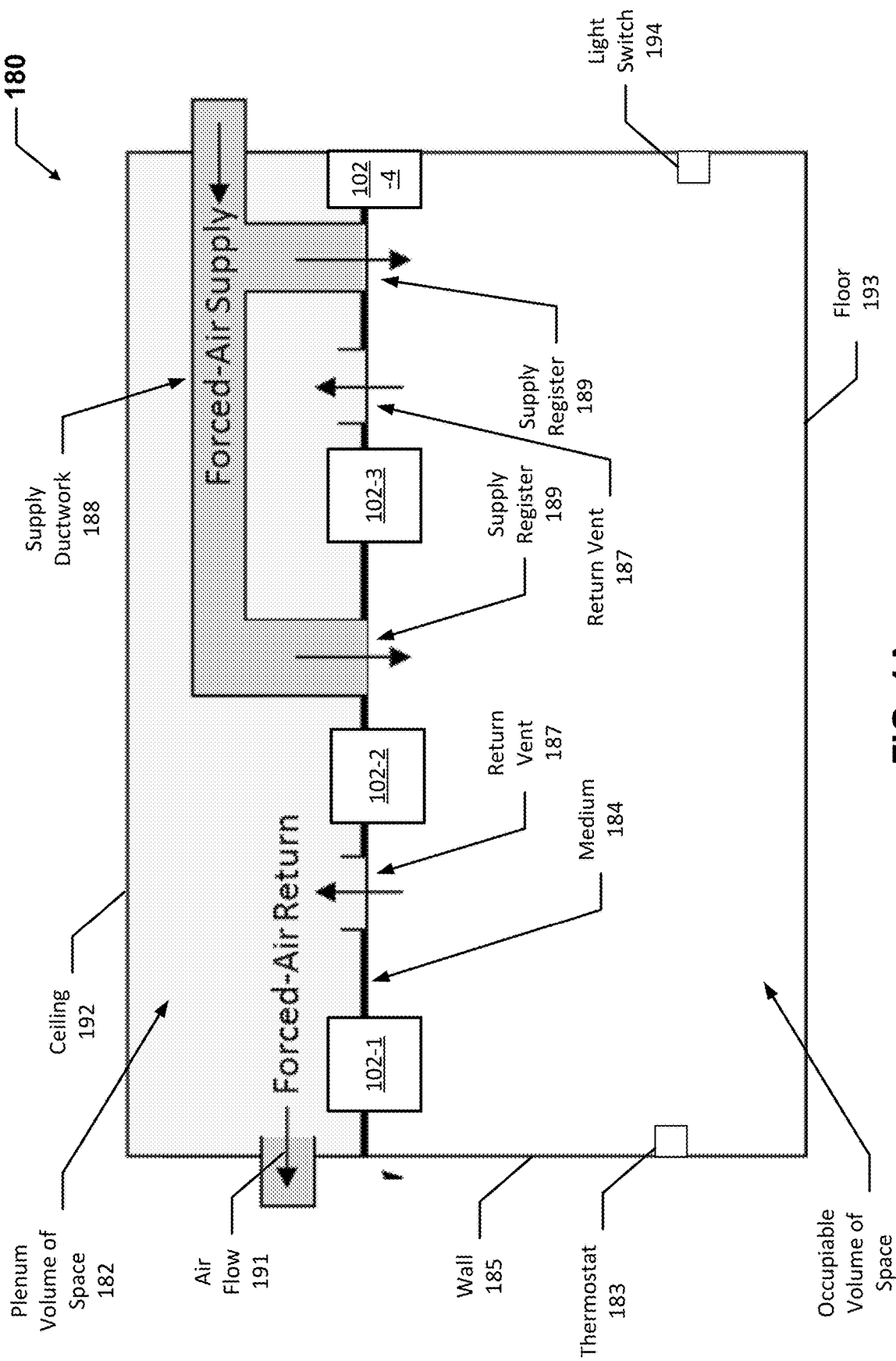
FIGS. 1A and 1B show a system in which example embodiments can be used.

In general, example embodiments provide systems, methods, and devices for light fixture sensors for external use. Example light fixture sensors for external use provide a number of benefits. Such benefits can include, but are not limited to, increased reliability of other systems (e.g., HVAC systems, fire protection systems) that are unrelated to a light fixture or a light fixture system, reduced power consumption, improved communication efficiency, ease of maintenance, and compliance with industry standards that apply to light fixtures located in certain environments.

Generally speaking, this application is directed to integrating one or more sensors with an enclosure, where the measurements taken by the sensor have no impact on the operation of the components within or otherwise associated with the enclosure. The specific examples provided herein are directed to the enclosure being a housing of a light fixture, where the measurements taken by the sensor mounted on the housing of the light fixture have no impact on the operation of the light fixture. However, it is contemplated herein that other types of enclosures can be used. Examples of other types of enclosures can include, but are not limited to, a housing for a motion sensor, a housing for a smoke detector, a housing for a ceiling fan, and a sprinkler head. Therefore, example embodiments can be used with any type of enclosure and are not specifically limited to use with a housing for a light fixture.

Light fixtures on which example sensors (also called sensor devices or sensor modules herein) can be mounted can be located in one or more of any of a number of environments. Examples of such environments can include, but are not limited to, indoors, outdoors, office space, a manufacturing plant, a warehouse, and a storage facility that is either climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with light fixtures having example sensors. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

The example light fixtures on which example sensors are disposed (or components thereof, including the sensors) can be made of one or more of a number of suitable materials to allow the light fixture and/or other associated components of a system to meet certain standards and/or regulations while also maintaining durability in light of the one or more conditions under which the light fixtures and/or other associated components of the light fixture can be exposed. Examples of such materials can include, but are not limited to, aluminum, stainless steel, fiberglass, glass, plastic, ceramic, and rubber.

Example light fixtures having example sensors, or portions thereof, described herein can be made from a single piece (as from a mold, injection mold, die cast, or extrusion process). In addition, or in the alternative, example light fixtures having example sensors can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of light fixture sensors for external use, one or more of the components shown may be omitted, repeated, and/or substituted. Accordingly, example embodiments of light fixture sensors for external use should not be considered limited to the specific arrangements of components shown in any of the figures. For example, features shown in one or more figures or described with respect to one embodiment can be applied to another embodiment associated with a different figure or description.

In certain example embodiments, light fixture sensors for external use are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow a corresponding device to meet) such standards when applicable.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of light fixture sensors for external use will be described more fully hereinafter with reference to the accompanying drawings, in which example embodiments of light fixture sensors for external use are shown. Light fixture sensors for external use may, however, be embodied in many different forms and should not be construed as limited to the example embodiments set forth herein. Rather, these example embodiments are provided so that this disclosure will be thorough and complete, and will fully convey the scope of light fixture sensors for external use to those of ordinary skill in the art. Like, but not necessarily the same, elements (also sometimes called components) in the various figures are denoted by like reference numerals for consistency.

Terms such as "first", "second", "above", "below", "distal", "proximal", "end", "top", "bottom", "side", and "within" are used merely to distinguish one component (or part of a component or state of a component) from another. Such terms are not meant to denote a preference or a particular orientation, and are not meant to limit embodiments of light fixture sensors for external use. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
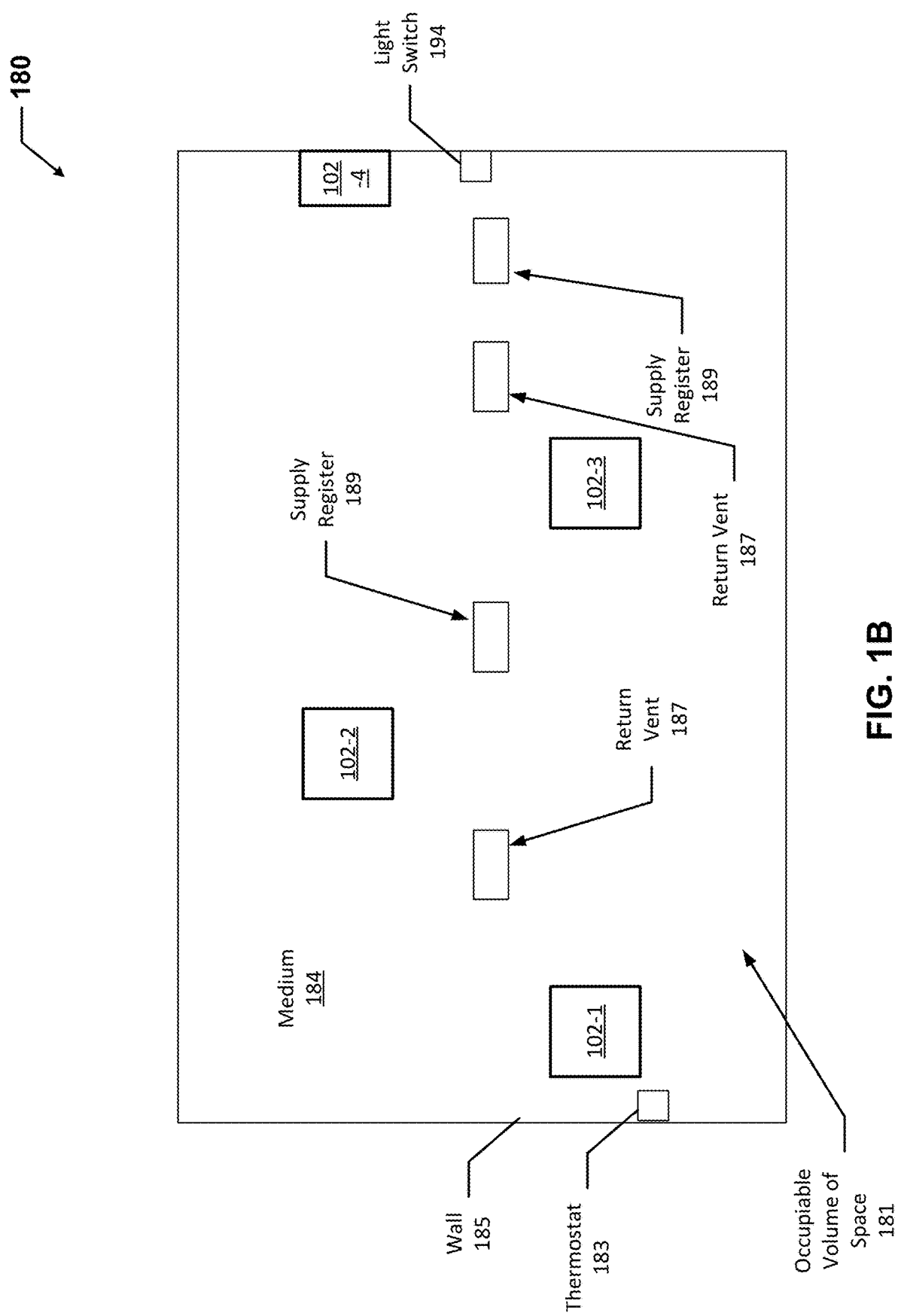

FIGS. 1A and 1B show a system 180 in which example embodiments can be used. Specifically, FIG. 1A shows a side view (looking from one wall 185 toward an opposing wall 185) of the system 180, and FIG. 1B shows a bottom view (looking from the floor 193 toward the medium 184) of the system 180. In this case, the system 180 encompasses a room having a drop ceiling 184 (more generally called a medium 184) that defines an occupiable volume of space 181 below the medium 184 and a plenum volume of space 182 above the medium 184. The occupiable volume of space 181 and the plenum volume of space 182 are also defined by one or more walls 185. The plenum volume of space 182 is further defined by a ceiling 192. The occupiable volume of space 181 is further defined by a floor 193.

There can be one or more systems that are fully or partially located within the occupiable volume of space 181, the plenum volume of space 182, or both. For example, in this case, there is a lighting system and a HVAC system in both the occupiable volume of space 181 and the plenum volume of space 182. Examples of other systems can include, but are not limited to, a security system, a fire protection system, a networking system, and a media system.

In this example, the portions of the HVAC system present in the system 180 of FIG. 1 include supply ductwork 188 located in the plenum volume of space 182, two supply registers 189 located at the distal end of the supply ductwork 188 and disposed in the medium 184, two return vents 187 disposed in the medium 184 adjacent to the plenum volume of space 182, and a thermostat 183 located on one of the walls 185 in the occupiable volume of space 181. The air flow 191 forced by the HVAC system is also shown in FIG. 1. The air flow 191 follows the following path: the forced air supply (part of the air flow 191) is sent by the HVAC unit through the supply ductwork 188 within the plenum volume of space 182, through the supply registers 189 into the occupiable volume of space 181. The forced air return (part of the air flow 191) flows from the occupiable volume of space 181, through the return vents 187, and into the plenum volume of space 182 to return to the HVAC unit.

The portions of the lighting system present in the system 180 of FIG. 1 include four light fixtures 102 (light fixture 102-1, light fixture 102-2, light fixture 102-3, and light fixture 102-4) that are all disposed in the medium 184 and a light switch 194 disposed on another wall 185 in the occupiable volume of space 181. Even though the four light fixtures 102 are disposed in the medium 184, a top portion of each light fixture 102 is disposed in the plenum volume of space 182, and a bottom portion of each light fixture 102 is disposed in the occupiable volume of space 181.

As shown in FIG. 1B, the location of each of the light fixtures 102, return vents 187, and supply registers 189 are disbursed along the plane formed by the medium 184. If each light fixture 102 has an example sensor device (e.g., a differential pressure sensor), then the aggregate measurements taken by each of the example sensors can be used to refine the external system (e.g., improve control of a HVAC system) in the occupiable volume of space 181. In certain example embodiments, the location of the light fixtures 102 having multi-port sensors (as with the sensors 40 described below with respect to FIG. 4), as well as the location and layout of the various equipment of the HVAC system (or other system in some cases) is known and can be used to provide precise controls and actions based on measurements made by a multi-port sensor.

Figure 2:
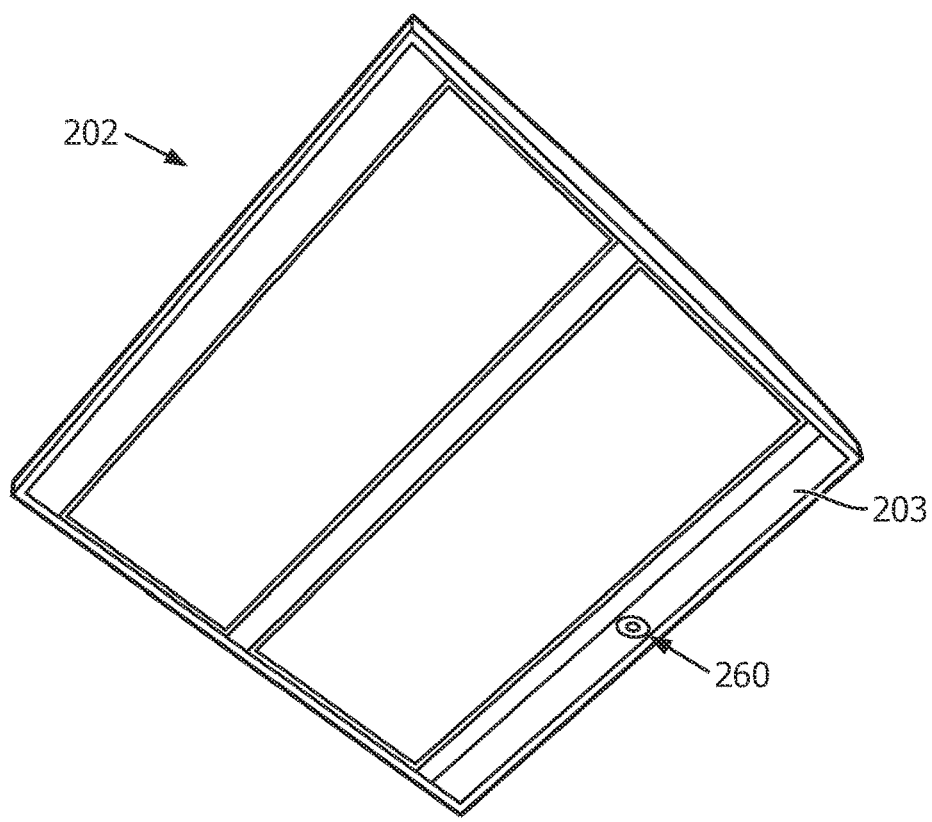
FIG. 2 shows a light fixture in which an example sensor for external use can be disposed.

FIG. 2 shows a light fixture 202 in which an example sensor for external use can be disposed. Referring to FIGS. 1 and 2, the light fixture 202 of FIG. 2 is a troffer light shown in a bottom-side perspective view, so that the bottom portion of the light fixture 202 is visible and the top portion of the light fixture 202 is hidden from view. The light fixture 202 includes a housing 203, and the housing 203 can have one or more sensors 260 disposed thereon. In the current art, the sensors 260 disposed on or within the housing 203 of the light fixture 202 are used to measure one or more parameters that affect the operation of the light fixture 202. Examples of such parameters include, but are not limited to, motion, an amount of ambient light, and a level of infrared radiation.

In certain example embodiments, one or more of the sensors 260 that are disposed on or within the housing 203 of the light fixture 202 can measure one or more parameters that do not directly affect the operation of the light fixture 202. Instead, the parameters (e.g., pressure, pressure differential, temperature, temperature differential, carbon monoxide, carbon monoxide differential, humidity, humidity differential) measured by such example sensors 260 can directly affect the operation of one or more other unrelated system (e.g., a HVAC system). While the sensor 260 in this case is visible from the occupiable volume of space 181, in certain embodiments an example sensor 260 would be hidden from view. For instance, if the example sensor 260 is a differential pressure sensor, such as the sensor 360 shown below with respect to FIG. 3, each port of the sensor 260 can be "plumbed" or "vented" to the side of the light fixture 202 disposed in the plenum volume of space 182 as well as the side of the light fixture 202 disposed in the occupiable volume of space 181.

Figure 3:
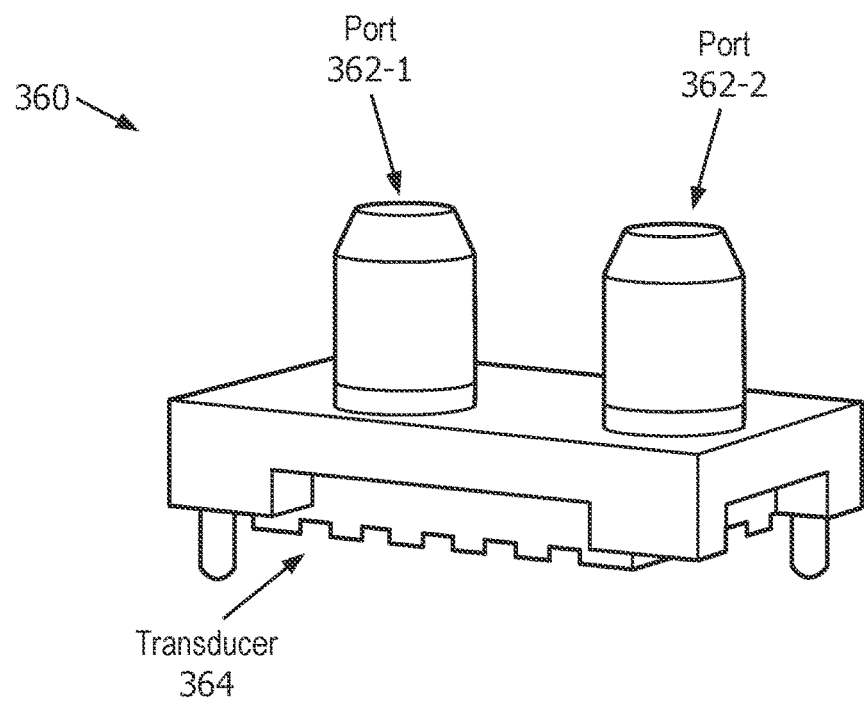
FIG. 3 shows a sensor device in accordance with certain example embodiments.

FIG. 3 shows a sensor device 360 in accordance with certain example embodiments. Referring to FIGS. 1-3, the sensor device 360 of FIG. 3 is a differential pressure sensor. The sensor 360 includes one or more (in this case, two) ports 362 (in this case, port 362-1 and port 362-2) and a transducer 364 in communication with the two ports 362. Each port 362 measures a pressure, and the transducer 364 determines a pressure differential between the two pressures measured by the ports 362. As an example, port 362-1 can be disposed in the occupiable volume of space 181, where port 362-1 measures the pressure in the occupiable volume of space 181. In addition, port 362-2 can be disposed in the plenum volume of space 182, where port 362-2 measures the pressure in the plenum volume of space 182.

The transducer 364 can receive the pressure in the occupiable volume of space 181 measured by port 362-1 and the pressure in the plenum volume of space 182 measured by port 362-2 to determine the pressure differential between the occupiable volume of space 181 and the plenum volume of space 182. In such a case, port 362-1 can have one polarity (e.g., positive), while port 362-2 can have the opposite polarity (e.g., negative), as the pressure in the plenum volume of space 182 is expected to be lower than the pressure in the occupiable volume of space 181.

If the sensor 360 is disposed on a light fixture (e.g., light fixture 102-1), the pressure differential measured by the sensor 360 can be useful for one or more systems affecting one or more volumes of space (e.g., occupiable volume of space 181, plenum volume of space 182) that have nothing to do with the light fixture or the overall lighting system. For example, the pressure differential measured by the sensor 360 can be used, at least in part, to identify one or more components (e.g., supply ductwork 188) of a HVAC system that may need to be balanced, repaired, and/or replaced. As another example, the pressure differential measured by the sensor 360 can be used, at least in part, to notify a security system that a window in the occupiable volume of space 181 has been opened or broken. As yet another example, the pressure differential measured by the sensor 360 can be used, at least in part, to notify a fire protection system that there is a fire burning in the occupiable volume of space 181.

In certain example embodiments, rather than the two ports 362 and the transducer 364 being part of the same sensor device 360, they can be multiple discrete devices that are communicably coupled to each other. For example, port 362-1 can be a discrete sensor that measures the pressure in the occupiable volume of space 181, port 362-2 can be a second discrete sensor that the pressure in the plenum volume of space 182, and the transducer 364 can be a third discrete component that receives the pressure in the occupiable volume of space 181 measured by port 362-1 and the pressure in the plenum volume of space 182 measured by port 362-2 to determine the pressure differential between the occupiable volume of space 181 and the plenum volume of space 182. In such a case, these discrete components can be coupled to the housing (e.g., housing 203) of a light fixture (e.g., light fixture 202).

Figure 4:
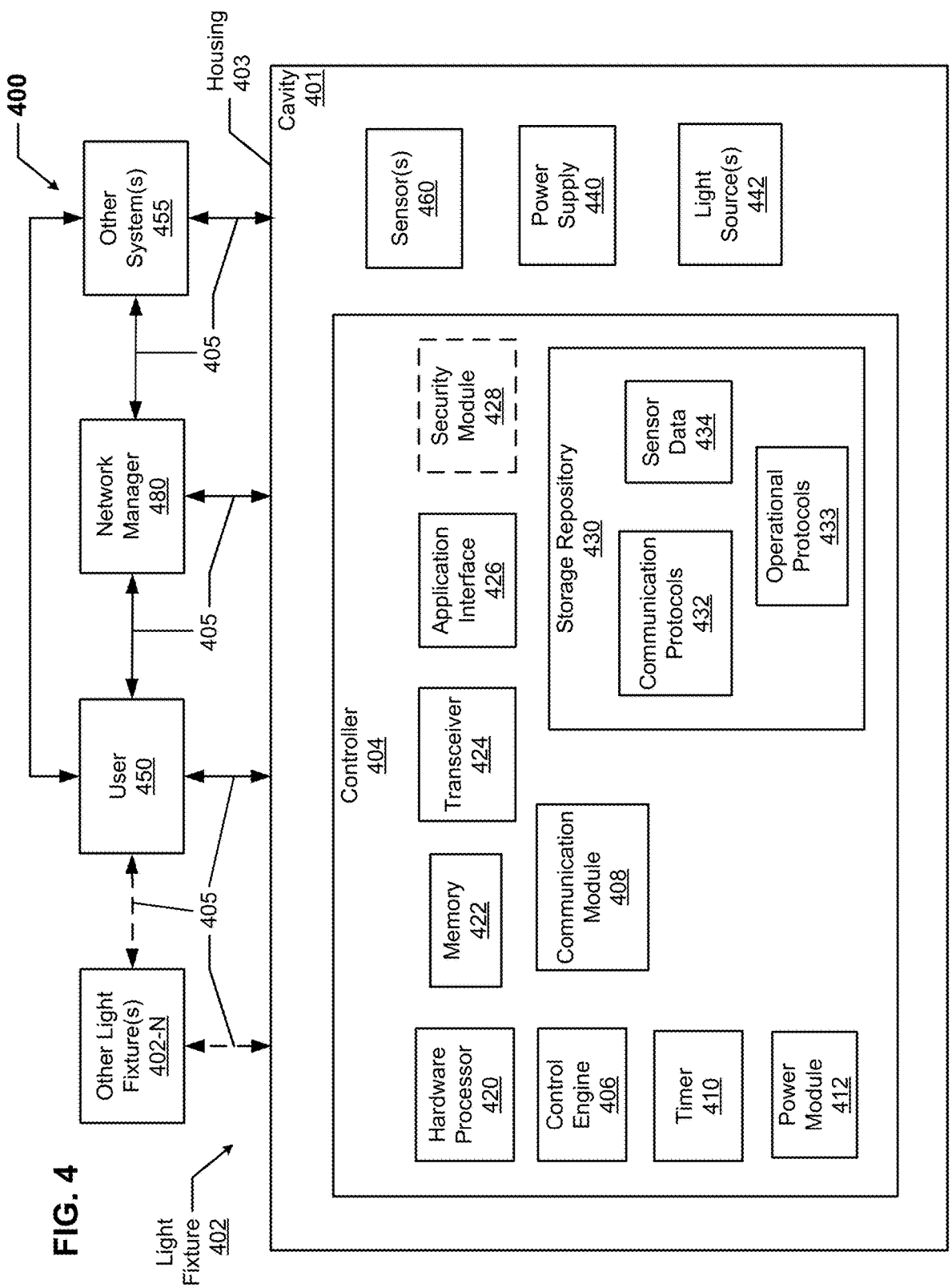
FIG. 4 shows a system diagram of a lighting system that includes a light fixture in accordance with certain example embodiments.

FIG. 4 shows a system diagram of a lighting system 400 that includes a controller 404 of a light fixture 402 in accordance with certain example embodiments. The lighting system 400 can include one or more other systems 455, a user 450, a network manager 480, a light fixture 402, and one or more other optional light fixtures 402-N. In addition to the controller 404, the light fixture 402 can include a power supply 440, a number of light sources 442, and one or more sensors 460. The controller 404 can include one or more of a number of components. Such components, can include, but are not limited to, a control engine 406, a communication module 408, a timer 410, a power module 412, a storage repository 430, a hardware processor 420, a memory 422, a transceiver 424, an application interface 426, and, optionally, a security module 428. The components shown in FIG. 4 are not exhaustive, and in some embodiments, one or more of the components shown in FIG. 4 may not be included in an example light fixture. Any component of the example light fixture 402 can be discrete or combined with one or more other components of the light fixture 402.

The user 450 is the same as a user defined above. The user 450 can use a user system (not shown), which may include a display (e.g., a GUI). The user 450 interacts with (e.g., sends data to, receives data from) the controller 404 of the light fixture 402 via the application interface 426 (described below). The user 450 can also interact with a network manager 480, the other systems 455, the light fixture 402, the other light fixtures 402-N, and/or one or more of the sensors 460. Interaction between the user 450 and the light fixture 402, the network manager 480, the other systems 455, the other light fixtures 402-N, and the sensors 460 is conducted using communication links 405. Each communication link 405 can include wired (e.g., Class 1 electrical cables, Class 2 electrical cables, electrical connectors) and/or wireless (e.g., Wi-Fi, Zigbee, visible light communication, cellular networking, Bluetooth, WirelessHART, ISA100, Power Line Carrier, RS485, DALI) technology. For example, a communication link 405 can be (or include) one or more electrical conductors that are coupled to the housing 403 of the light fixture 402 and to a sensor 460. The communication link 405 can transmit signals (e.g., power signals, communication signals, control signals, data) between the light fixture 402 and the user 450, the network manager 480, the other systems 455, the other light fixtures 402-N, and/or one or more of the sensors 460.

The network manager 480 is a device or component that controls all or a portion of a communication network that includes the controller 404 of the light fixture 402, the user 450, the other systems 455, the other light fixtures 402-N, and the sensors 460 that are communicably coupled to the controller 404. The network manager 480 can be substantially similar to the controller 404. Alternatively, the network manager 480 can include one or more of a number of features in addition to, or altered from, the features of the controller 404 described below. As described herein, communication with the network manager 480 can include communicating with one or more other components (e.g., another light fixture) of the system 400. In such a case, the network manager 480 can facilitate such communication.

The other systems 455 can be any system within the master system 100 aside from the lighting system, which includes the light fixture 402 and any other light fixtures 402-N. Examples of such other systems 455 can include, but are not limited to, a HVAC system, a security system, a fire protection system, a networking system, and a media system. The parameters measured by the sensors 460 can be used to improve, force an action, lead to a redesign or adjustment, and/or otherwise affect the operation of one or more such other system 455.

In certain example embodiments, the one or more other systems 455 know the location of each light fixture 402 (or even more specifically the location of each sensor 460 of each light fixture 402) within the occupiable volume of space (e.g., occupiable volume of space 181) and the plenum volume of space (e.g., plenum volume of space 182). This location information can be provided to such other system 455 by, for example, the network manager 480 or the controller 404 of each light fixture 402). Such other system 455 also knows the location and layout of its own equipment (e.g., return vents 187, supply ductwork 188) within the occupiable volume of space (e.g., occupiable volume of space 181) and the plenum volume of space (e.g., plenum volume of space 182).

Also, the signals sent by the transceiver 424 can include both measurements made by a sensor 460 and an ID (or other type of address, such as a MAC) of the sensor 460 and/or the light fixture 402. In this way, when a signal sent by the transceiver 424 is received (e.g., by the other system 455, by the network manager 480, by a controller of another light fixture 402-N), the light fixture 402 of the transceiver 424 sending the signal can be specifically identified. Further, if the receiving component of the system 400 knows the location of the light fixture 402, the location information can be used in conjunction with the content (e.g., measurements by the sensor 460) of the signal.

In this way, a mapped grid of the sensors 460 relative to the applicable other system 455 is available to allow for control and optimization of the other system 455. For example, if a particular sensor 460 of a particular light fixture 402 shows an excessively high pressure differential (exceeding a threshold value), then the other system 455 can make specific adjustments to reduce the pressure differential, as measured by that sensor 460, back within an acceptable range (below the threshold value), As a result, example embodiments can be used to provide real-time and targeted information to allow the other system 455 to be optimized in real time.

The optional other light fixtures 402-N can be part of a lighting system with the light fixture 402. The other light fixtures 402-N can be substantially the same as the light fixture 402 described herein. One or more components of the light fixture 402 can be shared with one or more of the other light fixtures 402-N. For example, the controller 404 of the light fixture 402 can also control some or all of the other light fixtures 402-N.

The sensors 460 are substantially the same as the sensors described above. For example, a sensor 460 can include multiple ports. As another example, the parameters measured by the sensors 460 do not directly affect the operation of the light fixture 402 or the other light fixtures 402-N, if any. Instead, the parameters (e.g., pressure, pressure differential, temperature, temperature differential, carbon monoxide, carbon monoxide differential, carbon dioxide, carbon dioxide differential, humidity, humidity differential) measured by such example sensors 460 can directly affect the operation of one or more other unrelated systems 455 (e.g., a HVAC system, security system, fire protection system).

The one or more sensors 460 can be any type of sensing device that measure one or more parameters. Examples of types of sensors 460 can include, but are not limited to, a passive infrared sensor, a photocell, a differential pressure sensor, a humidity sensor, a pressure sensor, an air flow monitor, a gas detector, and a resistance temperature detector. A parameter that can be measured by a sensor 460 can include, but is not limited to, pressure, humidity, and an ambient temperature. While the light fixture 402 can include one or more sensors that are used to operate the light fixture 402, the example sensors 460 described herein are not used for such a purpose. Each sensor 460 can use one or more of a number of communication protocols. A sensor 460 can be associated with the light fixture 402 and/or one or more other light fixtures 460-N in the system 400.

The user 450, the network manager 480, the other systems 455, the other light fixtures 402-N, and/or the sensors 460 can interact with the controller 404 of the light fixture 402 using the application interface 426 in accordance with one or more example embodiments. Specifically, the application interface 426 of the controller 404 receives data (e.g., information, communications, instructions, updates to firmware) from and sends data (e.g., information, communications, instructions) to the user 450, the network manager 480, the other systems 455, the other light fixtures 402-N, and/or each sensor 460. The user 450, the network manager 480, the other systems 455, the other light fixtures 402-N, and/or each sensor 460 can include an interface to receive data from and send data to the controller 404 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 404, the user 450, the network manager 480, the other systems 455, the other light fixtures 402-N, and/or the sensors 460 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 404. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 5.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 400.

The light fixture 402 can include a housing 403. The housing 403 can include at least one wall that forms a cavity 401. In some cases, the housing 403 can be designed to comply with any applicable standards so that the light fixture 402 can be located in a particular environment. The housing 403 can form any type of light fixture 402, including but not limited to a troffer light fixture, a down can light fixture, a recessed light fixture, and a pendant light fixture. The housing 403 can also be used to combine the light fixture 402 with some other device, including but not limited to a ceiling fan, a smoke detector, a broken glass detector, a garage door opener, and a wall clock.

The housing 403 of the light fixture 402 can be used to house one or more components of the light fixture 402, including one or more components of the controller 404. For example, as shown in FIG. 4, the controller 404 (which in this case includes the control engine 406, the communication module 408, the timer 410, the power module 412, the storage repository 430, the hardware processor 420, the memory 422, the transceiver 424, the application interface 426, and the optional security module 428), the power supply 440, and the light sources 442 are disposed in the cavity 401 formed by the housing 403. In alternative embodiments, any one or more of these or other components (e.g., a sensor 460) of the light fixture 402 can be disposed on the housing 403 and/or remotely from the housing 403.

The storage repository 430 can be a persistent storage device (or set of devices) that stores software and data used to assist the controller 404 in communicating with the user 450, the network manager 480, the other systems 455, the other light fixtures 402-N, and one or more sensors 460 within the system 400. In one or more example embodiments, the storage repository 430 stores one or more communication protocols 432, operational protocols 433, and sensor data 434. The communication protocols 432 can be any of a number of protocols that are used to send and/or receive data between the controller 404 and the user 450, the network manager 480, the other systems 455, the other light fixtures 402-N, and one or more sensors 460. One or more of the communication protocols 432 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 432 can provide a layer of security to the data transferred within the system 400.

The operational protocols 433 can be any algorithms, models, formulas, logic steps, and/or other similar operational implementations that the control engine 406 of the controller 404 follows based on certain conditions at a point in time. An example of an operational protocol 433 is instructing a sensor 460 to take one or more measurements, evaluate (e.g., using threshold values and/or other information stored in the storage repository 430) the measurements made by the sensor 460, and send the results of the evaluation to the network manager 480 and/or the other systems 455 that could be impacted by the results of the evaluation. Another example of an operational protocol 433 is calibrating a sensor 460. The controller 404 can send an alarm to the user 450 and/or the network manager 480 when the sensor 460 is determined to be faulty or failing. Yet another example of an operational protocol 433 is to check one or more communication links 405 with the network manager 480 and, if a communication link 405 is not functioning properly, allow the controller 404 to operate autonomously from the rest of the system 400.

As another example of an operational protocol 433, configurations of the controller 404 can be stored in memory 422 (e.g., non-volatile memory) so that the controller 404 (or portions thereof) can operate regardless of whether the controller 404 is communicating with the network manager 480 and/or other components in the system 400. Still another example of an operational protocol 433 is identifying an adverse condition or event (e.g., excessive humidity, no pressure differential, extreme pressure differential, high temperature) based on measurements taken by a sensor 460. In such a case, the controller 404 can notify the network manager 480 and/or the affected other systems 455 as to the adverse condition or event identified. Yet another example of an operational protocol 433 is to have the controller 404 operate in an autonomous control mode if one or more components (e.g., the communication module 408, the transceiver 424) of the controller 404 that allows the controller 404 to communicate with another component of the system 400 fails.

Sensor data 434 can be any data associated with (e.g., collected by) each sensor 460 that is communicably coupled to the controller 404. Such data can include, but is not limited to, a manufacturer of the sensor 460, a model number of the sensor 460, communication capability of a sensor 460, power requirements of a sensor 460, and measurements taken by the sensor 460. Examples of a storage repository 430 can include, but are not limited to, a database (or a number of databases), a file system, a hard drive, flash memory, some other form of solid state data storage, or any suitable combination thereof. The storage repository 430 can be located on multiple physical machines, each storing all or a portion of the communication protocols 432, the operational protocols 433, and/or the sensor data 434 according to some example embodiments. Each storage unit or device can be physically located in the same or in a different geographic location.

The storage repository 430 can be operatively connected to the control engine 406. In one or more example embodiments, the control engine 406 includes functionality to communicate with the user 450, the network manager 480, the other systems 455, the other light fixtures 402-N, and the sensors 460 in the system 400. More specifically, the control engine 406 sends information to and/or receives information from the storage repository 430 in order to communicate with the user 450, the network manager 480, the other systems 455, the other light fixtures 402-N, and the sensors 460. As discussed below, the storage repository 430 can also be operatively connected to the communication module 408 in certain example embodiments.

In certain example embodiments, the control engine 406 of the controller 404 controls the operation of one or more components (e.g., the communication module 408, the timer 410, the transceiver 424) of the controller 404. For example, the control engine 406 can activate the communication module 408 when the communication module 408 is in "sleep" mode and when the communication module 408 is needed to send data received from another component (e.g., a sensor 460, the user 450) in the system 400. As another example, the control engine 406 can operate one or more sensors 460 to dictate when measurements are taken by the sensors 460 and when those measurements are communicated by the sensors 460 to the control engine 406. As another example, the control engine 406 can acquire the current time using the timer 410. The timer 410 can enable the controller 404 to control the light fixture 402 even when the controller 404 has no communication with the network manager 480.

As another example, the control engine 406 can check one or more communication links 405 between the controller 404 and the network manager 480 and, if a communication link 405 is not functioning properly, allow the controller 404 to operate autonomously from the rest of the system 400. As yet another example, the control engine 406 can store configurations of the controller 404 (or portions thereof) in memory 422 (e.g., non-volatile memory) so that the controller 404 (or portions thereof) can operate regardless of whether the controller 404 is communicating with the network controller 480 and/or other components in the system 400.

As still another example, the control engine 406 can obtain readings from an adjacent sensor (as from another light fixture 402-N) if the sensor 460 associated with the light fixture 402 malfunctions, if the communication link 405 between the sensor 460 and the controller 404 fails, and/or for any other reason that the readings of the sensor 460 associated with the light fixture 402 fails to reach the controller 404. To accomplish this, for example, the network manager 480 can instruct, upon a request from the control engine 406, the adjacent sensor 460 to communicate its readings to the control engine 406 of the controller 404 using communication links 405. As still another example, the control engine 406 can cause the controller 404 to operate in an autonomous control mode if one or more components (e.g., the communication module 408, the transceiver 424) of the controller 404 that allows the controller 404 to communicate with another component of the system 400 fails.

The control engine 406 can provide control, communication, and/or other similar signals to the user 450, the network manager 480, the other systems 455, the other light fixtures 402-N, and one or more of the sensors 460. Similarly, the control engine 406 can receive control, communication, and/or other similar signals from the user 450, the network manager 480, the other systems 455, the other light fixtures 402-N, and one or more of the sensors 460. The control engine 406 can control each sensor 460 automatically (for example, based on one or more algorithms stored in the storage repository 430) and/or based on control, communication, and/or other similar signals received from another device through a communication link 405. The control engine 406 may include a printed circuit board, upon which the hardware processor 420 and/or one or more discrete components of the controller 404 are positioned.

In certain example embodiments, the control engine 406 can include an interface that enables the control engine 406 to communicate with one or more components (e.g., power supply 440) of the light fixture 402. For example, if the power supply 440 of the light fixture 402 operates under IEC Standard 62386, then the power supply 440 can include a digital addressable lighting interface (DALI). In such a case, the control engine 406 can also include a DALI to enable communication with the power supply 440 within the light fixture 402. Such an interface can operate in conjunction with, or independently of, the communication protocols 432 used to communicate between the controller 404 and the user 450, the network manager 480, the other systems 455, the other light fixtures 402-N, and the sensors 460.

The control engine 406 (or other components of the controller 404) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I$^2$C), and a pulse width modulator (PWM).

The communication module 408 of the controller 404 determines and implements the communication protocol (e.g., from the communication protocols 432 of the storage repository 430) that is used when the control engine 406 communicates with (e.g., sends signals to, receives signals from) the user 450, the network manager 480, the other systems 455, the other light fixtures 402-N, and/or one or more of the sensors 460. In some cases, the communication module 408 accesses the sensor data 434 to determine which communication protocol is used to communicate with the sensor 460 associated with the sensor data 434. In addition, the communication module 408 can interpret the communication protocol of a communication received by the controller 404 so that the control engine 406 can interpret the communication.

The communication module 408 can send and receive data between the network manager 480, the other systems 455, the other light fixtures 402-N, and/or the users 450 and the controller 404. The communication module 408 can send and/or receive data in a given format that follows a particular communication protocol 432. The control engine 406 can interpret the data packet received from the communication module 408 using the communication protocol 432 information stored in the storage repository 430. The control engine 406 can also facilitate the data transfer between one or more sensors 460 and the network manager 480, the other systems 455, the other light fixtures 402-N, and/or a user 450 by converting the data into a format understood by the communication module 408.

The communication module 408 can send data (e.g., communication protocols 432, operational protocols 433, sensor data 434, operational information, error codes, threshold values, algorithms) directly to and/or retrieve data directly from the storage repository 430. Alternatively, the control engine 406 can facilitate the transfer of data between the communication module 408 and the storage repository 430. The communication module 408 can also provide encryption to data that is sent by the controller 404 and decryption to data that is received by the controller 404. The communication module 408 can also provide one or more of a number of other services with respect to data sent from and received by the controller 404. Such services can include, but are not limited to, data packet routing information and procedures to follow in the event of data interruption.

The timer 410 of the controller 404 can track clock time, intervals of time, an amount of time, and/or any other measure of time. The timer 410 can also count the number of occurrences of an event, whether with or without respect to time. Alternatively, the control engine 406 can perform the counting function. The timer 410 is able to track multiple time measurements concurrently. The timer 410 can track time periods based on an instruction received from the control engine 406, based on an instruction received from the user 450, based on an instruction programmed in the software for the controller 404, based on some other condition or from some other component, or from any combination thereof.

The timer 410 can be configured to track time when there is no power delivered to the controller 404 (e.g., the power module 412 malfunctions) using, for example, a super capacitor or a battery backup. In such a case, when there is a resumption of power delivery to the controller 404, the timer 410 can communicate any aspect of time to the controller 404. In such a case, the timer 410 can include one or more of a number of components (e.g., a super capacitor, an integrated circuit) to perform these functions.

The power module 412 of the controller 404 provides power to one or more other components (e.g., timer 410, control engine 406) of the controller 404. In addition, in certain example embodiments, the power module 412 can provide power (e.g., secondary power) to the power supply 440 of the light fixture 402. The power module 412 can include one or more of a number of single or multiple discrete components (e.g., transistor, diode, resistor), and/or a microprocessor. The power module 412 may include a printed circuit board, upon which the microprocessor and/or one or more discrete components are positioned. In some cases, the power module 412 can include one or more components that allow the power module 412 to measure one or more elements of power (e.g., voltage, current) that is delivered to and/or sent from the power module 412.

The power module 412 can include one or more components (e.g., a transformer, a diode bridge, an inverter, a converter) that receives power (for example, through an electrical cable) from the power supply 440 and/or a source external to the light fixture 402. The power module 412 can use this power to generate power of a type (e.g., alternating current, direct current) and level (e.g., 12V, 24V, 120V) that can be used by the other components of the controller 404. In addition, or in the alternative, the power module 412 can be a source of power in itself to provide signals to the other components of the controller 404 and/or the power supply 440. For example, the power module 412 can be a battery or other form of energy storage device. As another example, the power module 412 can be a localized photovoltaic solar power system.

In certain example embodiments, the power module 412 of the controller 404 can also provide power and/or control signals, directly or indirectly, to one or more of the sensors 460. In such a case, the control engine 406 can direct the power generated by the power module 412 to the sensors 460 and/or the power supply 440 of the light fixture 402. In this way, power can be conserved by sending power to the sensors 460 and/or the power supply 440 of the light fixture 402 when those devices need power, as determined by the control engine 406.

The hardware processor 420 of the controller 404 executes software, algorithms, and firmware in accordance with one or more example embodiments. Specifically, the hardware processor 420 can execute software on the control engine 406 or any other portion of the controller 404, as well as software used by the user 450, the network manager 480, the other systems 455, the other light fixtures 402-N, and/or one or more of the sensors 460. The hardware processor 420 can be an integrated circuit, a central processing unit, a multi-core processing chip, SoC, a multi-chip module including multiple multi-core processing chips, or other hardware processor in one or more example embodiments. The hardware processor 420 is known by other names, including but not limited to a computer processor, a microprocessor, and a multi-core processor.

In one or more example embodiments, the hardware processor 420 executes software instructions stored in memory 422. The memory 422 includes one or more cache memories, main memory, and/or any other suitable type of memory. The memory 422 can include volatile and/or non-volatile memory. The memory 422 is discretely located within the controller 404 relative to the hardware processor 420 according to some example embodiments. In certain configurations, the memory 422 can be integrated with the hardware processor 420.

In certain example embodiments, the controller 404 does not include a hardware processor 420. In such a case, the controller 404 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices can be used in conjunction with one or more hardware processors 420.

The transceiver 424 of the controller 404 can send and/or receive control and/or communication signals. Specifically, the transceiver 424 can be used to transfer data between the controller 404 and the user 450, the network manager 480, the other systems 455, the other light fixtures 402-N, and/or the sensors 460. The transceiver 424 can use wired and/or wireless technology. The transceiver 424 can be configured in such a way that the control and/or communication signals sent and/or received by the transceiver 424 can be received and/or sent by another transceiver that is part of the user 450, the network manager 480, the other systems 455, the other light fixtures 402-N, and/or the sensors 460. The transceiver 424 can use any of a number of signal types, including but not limited to radio frequency signals and visible light signals.

When the transceiver 424 uses wireless technology, any type of wireless technology can be used by the transceiver 424 in sending and receiving signals. Such wireless technology can include, but is not limited to, Wi-Fi, Zigbee, visible light communication, cellular networking, and Bluetooth. The transceiver 424 can use one or more of any number of suitable communication protocols (e.g., ISA100, HART) when sending and/or receiving signals. Such communication protocols can be stored in the communication protocols 432 of the storage repository 430. Further, any transceiver information for the user 450, the network manager 480, the other systems 455, the other light fixtures 402-N, and/or the sensors 460 can be part of the communication protocols 432 (or other areas) of the storage repository 430.

Optionally, in one or more example embodiments, the security module 428 secures interactions between the controller 404, the user 450, the network manager 480, the other systems 455, the other light fixtures 402-N, and/or the sensors 460. More specifically, the security module 428 authenticates communication from software based on security keys verifying the identity of the source of the communication. For example, user software may be associated with a security key enabling the software of the user 450 to interact with the controller 404 and/or the sensors 460. Further, the security module 428 can restrict receipt of information, requests for information, and/or access to information in some example embodiments.

As mentioned above, aside from the controller 404 and its components, the light fixture 402 can include one or more sensors 460, a power supply 440, and one or more light sources 442. The sensors 460 are described above. The light sources 442 of the light fixture 402 are devices and/or components typically found in a light fixture to allow the light fixture 402 to operate. The light sources 442 emit light using power provided by the power supply 440. The light fixture 402 can have one or more of any number and/or type (e.g., light-emitting diode, incandescent, fluorescent, halogen) of light sources 442. A light source 442 can vary in the amount and/or color of light that it emits.

The power supply 440 of the light fixture 402 receives power (e.g., primary power, secondary power) from an external source (e.g., a wall outlet, an energy storage device). The power supply 440 uses the power it receives to generate and provide power (called also final power herein) to the power module 412 of the controller 404, the sensors 460, and one or more of the light sources 442. The power supply 440 can be called by any of a number of other names, including but not limited to a driver, a LED driver, and a ballast. The power supply 440 can include one or more of a number of single or multiple discrete components (e.g., transistor, diode, resistor), and/or a microprocessor. The power supply 440 may include a printed circuit board, upon which the microprocessor and/or one or more discrete components are positioned, and/or a dimmer.

In some cases, the power supply 440 can include one or more components (e.g., a transformer, a diode bridge, an inverter, a converter) that receives power (for example, through an electrical cable) from the power module 412 of the controller 404 and generates power of a type (e.g., alternating current, direct current) and level (e.g., 12V, 24V, 120V) that can be used by sensors 460 and/or the light sources 442. In addition, or in the alternative, the power supply 440 can be a source of power in itself. For example, the power supply 440 can or include be a battery, a localized photovoltaic solar power system, or some other source of independent power.

The light fixture 402 (part of the existing light fixture 499 before being retrofitted) can also include one or more of a number of other components. Examples of such other components can include, but are not limited to, a heat sink, an electrical conductor or electrical cable, a terminal block, a lens, a diffuser, a reflector, an air moving device, a baffle, and a circuit board.

As stated above, the light fixture 402 can be placed in any of a number of environments. In such a case, the housing 403 of the light fixture 402 can be configured to comply with applicable standards for any of a number of environments. For example, the light fixture 402 can be rated as a Division 1 or a Division 2 enclosure under NEC standards. Similarly, any of the sensors 460 or other devices communicably coupled to the light fixture 402 can be configured to comply with applicable standards for any of a number of environments. For example, a sensor 460 can be rated as a Division 1 or a Division 2 enclosure under NEC standards.

FIG. 5 illustrates one embodiment of a computing device 518 that implements one or more of the various techniques described herein, and which is representative, in whole or in part, of the elements described herein pursuant to certain example embodiments. For example, computing device 518 can be implemented in the light fixture 402 of FIG. 4 in the form of the hardware processor 420, the memory 422, and the storage repository 430, among other components. Computing device 518 is one example of a computing device and is not intended to suggest any limitation as to scope of use or functionality of the computing device and/or its possible architectures. Neither should computing device 518 be interpreted as having any dependency or requirement relating to any one or combination of components illustrated in the example computing device 518.

Computing device 518 includes one or more processors or processing units 514, one or more memory/storage components 515, one or more input/output (I/O) devices 516, and a bus 517 that allows the various components and devices to communicate with one another. Bus 517 represents one or more of any of several types of bus structures, including a memory bus or memory controller, a peripheral bus, an accelerated graphics port, and a processor or local bus using any of a variety of bus architectures. Bus 517 includes wired and/or wireless buses.

Memory/storage component 515 represents one or more computer storage media. Memory/storage component 515 includes volatile media (such as random access memory (RAM)) and/or nonvolatile media (such as read only memory (ROM), flash memory, optical disks, magnetic disks, and so forth). Memory/storage component 515 includes fixed media (e.g., RAM, ROM, a fixed hard drive, etc.) as well as removable media (e.g., a Flash memory drive, a removable hard drive, an optical disk, and so forth).

One or more I/O devices 516 allow a customer, utility, or other user to enter commands and information to computing device 518, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 518 includes at least the minimal processing, input, and/or output means necessary to practice one or more embodiments.

Further, those skilled in the art will appreciate that one or more elements of the aforementioned computer device 518 is located at a remote location and connected to the other elements over a network in certain example embodiments. Further, one or more embodiments is implemented on a distributed system having one or more nodes, where each portion of the implementation (e.g., control engine 406) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Example embodiments provide a number of benefits. Such benefits can include, but are not limited to, increased reliability of other systems (e.g., HVAC systems, fire protection systems) that are unrelated to a light fixture or a light fixture system, reduced power consumption, improved communication efficiency, ease of maintenance, and compliance with industry standards that apply to light fixtures located in certain environments.

Example embodiments provide a much greater degree of resolution for systems unrelated to the light fixture or other device on which a sensor is disposed. For instance a room will often be controlled based on a single thermostat located somewhere in the general vicinity (likely not even in the room being controlled). Using example embodiments, there can be multiple locations of measurement of a parameter (e.g., temperature) within the room being monitored since each light fixture in the room has the ability to measure the parameter, thereby offering much more information that can be used for control optimization.

In buildings with plenum air handling spaces, example embodiments can be used to measure a differential pressure sensor with one side (e.g., negative) of the sensor measuring the pressure in the plenum and the other side (e.g., positive) of the sensor measuring the room pressure. This information can be useful to designers of HVAC systems to further optimize their strategy for control. By multiple light fixtures in a lighting system enabled with this capability, the controller receiving the measurements can communicate how the air is being distributed throughout the building or control area. Such a controller can even recommend how adjustments can be made to better optimize the system. For example, airflow adjustments could be made, allowing for a higher degree of control, yielding higher optimization of comfort and energy usage.

When combined with other sensor data (e.g., occupancy data) normally captured by the light fixtures for the same areas, even further optimization could be possible. Air quality measurements such as temperature, humidity, carbon monoxide, carbon dioxide, oxygen, for example, could further enhance the ability to strategically control the performance of the HVAC system and/or other system directly unrelated to the lighting system. Communication between a light fixture having an example sensor and other components (e.g., another system, a network manager) can be conducted using wired and/or wireless technology.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A lighting system, comprising:
a first light fixture, comprising:
a first housing disposed on a medium that separates an occupiable volume of space from a plenum volume of space; and
a first pressure sensor comprising:
a first port disposed in the occupiable volume of space, wherein the first port measures a first pressure in the occupiable volume of space;
a second port disposed in the plenum volume of space, wherein the second port measures a second pressure in the plenum volume of space; and
a first transducer coupled to the first port and the second port, wherein the first transducer determines a first pressure differential between the first pressure measured by the first port and the second pressure measured by the second port; and
an external system communicably coupled to the first pressure sensor, wherein the external system is unrelated to the first light fixture, wherein the external system comprises a controller that receives a first signal comprising the first pressure differential, wherein the first pressure differential is used to control operation of the external system,
wherein the external system identifies a first location of the first light fixture in the plenum volume of space and the occupiable volume of space using the first signal, wherein the operation of the external system is controlled by the external system based on the first location.

2. The lighting system of claim 1, further comprising:
a controller coupled to the first pressure sensor and the external system.

3. The lighting system of claim 2, further comprising:
a network manager coupled to the controller and the external system, wherein the controller sends the first pressure differential to the network manager, and wherein the network manager controls operation of the external system when the first pressure differential falls outside a range of acceptable values.

4. The lighting system of claim 3, wherein the external system comprises a HVAC system.

5. The lighting system of claim 3, wherein the external system comprises a fire protection system.

6. The lighting system of claim 1, further comprising:
a second light fixture, comprising:
a second housing disposed on the medium; and
a second pressure sensor comprising:
a third port disposed in the occupiable volume of space, wherein the third port measures a third pressure in the occupiable volume of space;
a fourth port disposed in the plenum volume of space, wherein the fourth port measures a fourth pressure in the plenum volume of space; and
a second transducer coupled to the third port and the fourth port, wherein the second transducer determines a second pressure differential between the third pressure measured by the third port and the fourth pressure measured by the fourth port,
wherein the second transducer is communicably coupled to the external system,
wherein the controller of the external system receives a second signal comprising the second pressure differential,
wherein the external system identifies a second location of the second light fixture in the plenum volume of space and the occupiable volume of space using the second signal, wherein the operation of the external system is further controlled by the external system based on the second differential and the second location.

7. The lighting system of claim 1, wherein the first port is a positive side of the first pressor sensor, and wherein the second port is a negative side of the first pressure sensor.

8. The lighting system of claim 1, wherein the first pressure differential measured by the first pressure sensor has no direct effect on an operation of a remainder of light fixture components.

9. The lighting system of claim 1, further comprising:
a controller coupled to the first pressure sensor, wherein the controller receives the first pressure differential from the first transducer.

10. The lighting system of claim 9, wherein the controller coupled to the first pressure sensor sends the first pressure differential to the controller of the external system, wherein the controller of the external system determines whether the first pressure differential falls within a range of acceptable values.

11. The lighting system of claim 9, wherein the controller coupled to the first pressure sensor determines whether the first pressure differential falls within a range of acceptable values.

12. The lighting system of claim 9, wherein the controller coupled to the first pressure sensor comprises a hardware processor, a transceiver, and memory.

13. The lighting system of claim 1, wherein the first light fixture further comprises a temperature sensor.

14. The lighting system of claim 1, wherein the first light fixture further comprises a humidity sensor.

15. The lighting system of claim 1, wherein the first light fixture further comprises a carbon dioxide sensor.

16. The lighting system of claim 1, further comprising:
a sensor device coupled to the light fixture, wherein the sensor device comprises:
a third port disposed in the occupiable volume of space, wherein the third port is configured to measure a first parameter in the occupiable volume of space;
a fourth port disposed in the plenum volume of space, wherein the fourth port is configured to measure a second parameter in the plenum volume of space; and
a second transducer coupled to the third port and the fourth port, wherein the second transducer is configured to determine a parameter differential between the first parameter measured by the third port and the second parameter measured by the fourth port.

* * * * *